United States Patent [19]
Janzen

[11] 3,844,094
[45] Oct. 29, 1974

[54] SUNFLOWER GATHERER FOR COMBINE HARVESTERS AND THE LIKE

[76] Inventor: George J. Janzen, Box 164, Winkler, Manitoba, Canada

[22] Filed: May 14, 1973

[21] Appl. No.: 359,775

[52] U.S. Cl.......................... 56/126, 56/128, 56/314
[51] Int. Cl............................................. A01d 45/30
[58] Field of Search ............................ 56/126–130, 56/119, 314, 330, 331

[56] References Cited
UNITED STATES PATENTS

| | | | |
|---|---|---|---|
| 1,104,213 | 7/1914 | Montgomery | 56/128 |
| 1,343,884 | 6/1920 | Hamilton | 56/128 X |
| 3,209,526 | 10/1965 | Morrow | 56/119 X |
| 3,260,041 | 7/1966 | McRoberts et al. | 56/126 X |

FOREIGN PATENTS OR APPLICATIONS

| | | | |
|---|---|---|---|
| 976,171 | 11/1964 | Great Britain | 56/126 |

*Primary Examiner*—Louis G. Mancene
*Assistant Examiner*—J. N. Eskovitz
*Attorney, Agent, or Firm*—Stanley G. Ade

[57] ABSTRACT

The sunflower gatherer is attached to a combine harvester and includes a plurality of spaced and parallel parting members secured to the front of the combine and extending forwardly. A rotational multi-lobed gathering component is situated above the parting members and a plurality of bristles are secured along the edges of the parting members to collect seeds from heads which may have shattered.

12 Claims, 4 Drawing Figures

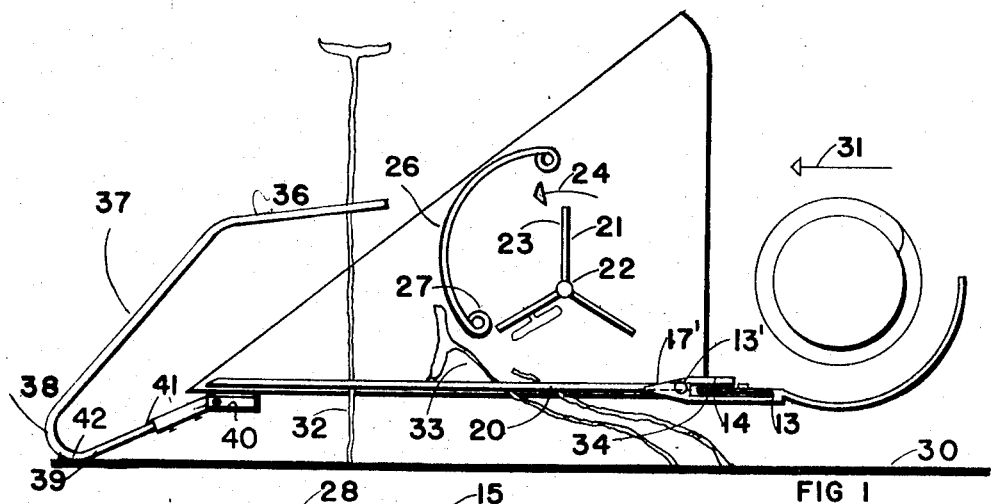
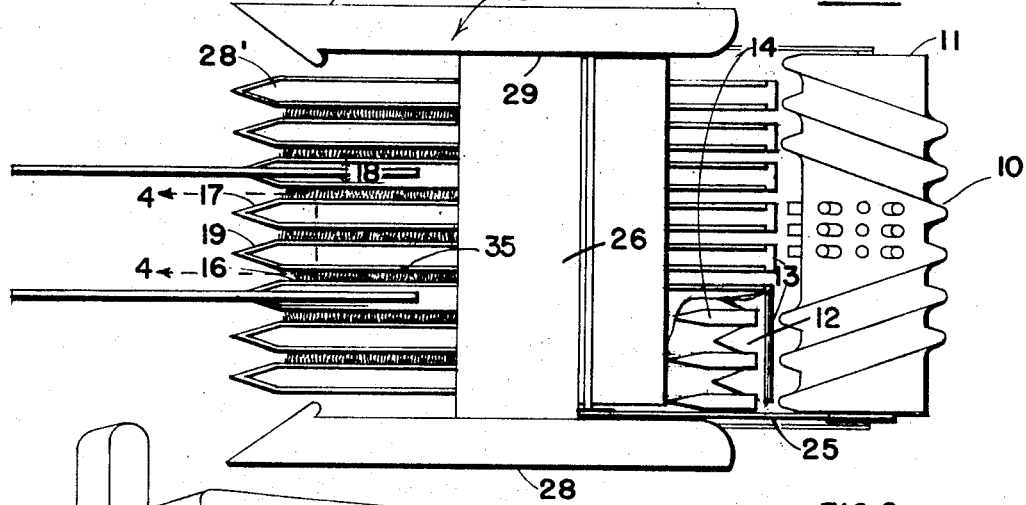
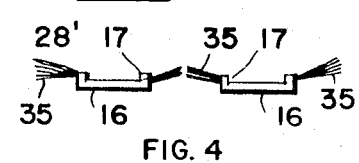
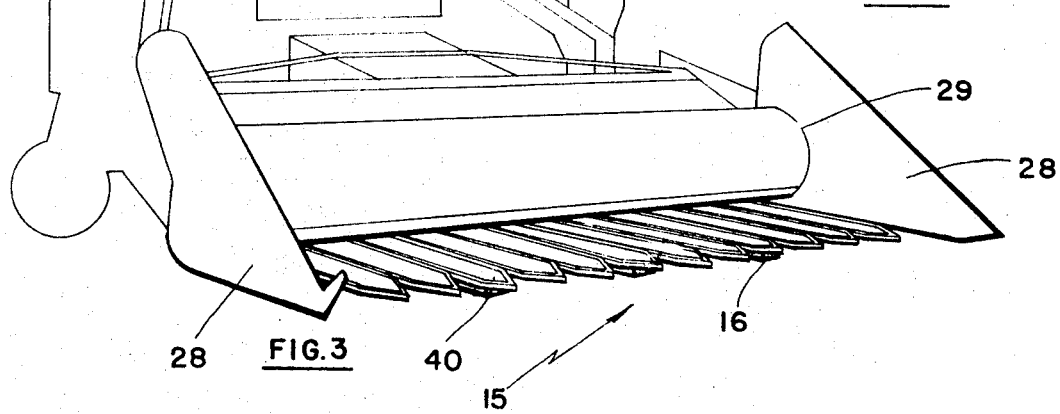

SUNFLOWER GATHERER FOR COMBINE HARVESTERS AND THE LIKE

This invention relates to new and useful improvements in sunflower harvesting devices, particularly suitable for attachment to combine harvesters and the like.

Sunflowers grow with a fairly long stalk and, when ready for harvesting, the heads are usually some distance from the ground and at varying heights.

When a conventional combine harvester is set to sever the lowermost heads, unfortunately a great deal of stalk remains attached to the majority of heads which tends to clog the interior of the combine during the threshing operation.

The present device overcomes this disadvantage by providing means to retard the entry of the sunflower head to the knives until it has been lowered to the knife level. I accomplish this by a curved shield spaced above a plurality of fingers and a multi-lobed member behind the shield so that the heads slide along adjacent fingers to the cutting knife assembly thus eliminating the majority of stalk.

Another object of the invention is to provide a device of the character herewithin described which is simply installed to any combine harvester and requires only a source of power to rotate the multi-lobed components.

Yet another object of the invention is to provide a device of the character herewithin described which is simple in construction, economical in manufacture, and otherwise well suited to the purpose for which it is designed.

With the foregoing in view, and such other or further purposes, advantages or novel features as may become apparent from consideration of this disclosure and specification, the present invention consists of the inventive concept which is essential in the arrangement and construction of parts all as hereinafter more particularly described, reference being had to the accompanying drawings in which:

FIG. 1 is a partially schematic side elevation showing the action of the device attached to the front portion of a combine.

FIG. 2 is a top plan view of the device attached to the forward end of a combine.

FIG. 3 is an isometric view of the device attached to the front of a combine shown in outline only.

FIG. 4 is an enlarged cross section along the line 4—4 of FIG. 2.

In the drawings like characters of reference indicate corresponding parts in the different figures.

Proceeding therefore to describe the invention in detail, reference character 10 illustrates the front end of a conventional combine having a rotatable auger 11 for gathering the severed crop and feeding same to the threshing concave.

Forwardly of this auger is a conventional cutting knife assembly 12 consisting of a reciprocating blade component 13 and stationary fingers 14 extending forwardly in spaced and parallel relationship.

My device collectively designated 15 consists of a plurality of spaced and parallel forwardly extending parting members 16 each one of which is provided with an attaching plate 17' on the rear end thereof by which it may be attached to the metal table or floor below auger 11 but forward of same. Components 12 and 14 are thus covered by the members 16 which are attached by bolts 13' immediately behind component 13.

Each of these parting members consists of a planar plate being reinforced at the edges 17 and having the transverse axis 18 parallel to the ground. The forward ends 19 are pointed as shown to facilitate the parting of the sunflower stalks so that they pass between adjacent members towards the cutting assembly 12.

Spanning adjacent the rear ends 20 of the members 16 is a multi-lobed component 21 consisting in this embodiment, of an axle or spindle 22 with three lobes or plates 23 extending therefrom equidistantly around the spindle 22. This is adapted to rotate in the direction of arrow 24 and is spaced just above the said members 20. Drive may be taken from the auger 11 by means of belt and pulley assembly 25 or from any other convenient source.

A forwardly curved shield 26 is situated vertically and spans across adjacent the inner ends 20 of the members 16, the lower edge 27 also being spaced above the upper surface 28' of the members 16. Side parting plates 28 are secured to the ends 29 of the curved shield 26 and act as crop dividers when the device is in use.

In operation, the combine cutting assembly together with the attachment may be set at any general height above ground level 30 so that the lowermost sunflower heads are above the members 16. As the combine progresses in the direction of arrow 31, the members 16 cause the stalks 32 of the sunflowers to pass between them so that the stalk or the head engages the curved shield 26. This retards the entry of the stalk into the knife assembly until the head reaches the position indicated by reference character 33 in FIG. 1. It then passes under the base 27 of the shield and remains engaged with the upper surfaces 28' of the members 16 assisted by the multi-lobed component 21 until it reaches the knife assembly in the position indicated by reference character 34 in FIG. 1 at which time it is severed with the minimum amount of stalk and collected by the auger 11. Due to this device, all of the heads are severed with the same amount of stalk which is minimal thus avoiding any clogging of the combine during the subsequent operations.

Situated between adjacent edges 17 of the members 16, is a plurality of fairly close flexible bristles 35 extending along the length of these members, said bristles inclining upwardly and outwardly from the edges 17 as shown in FIG. 4 so that the bristles barely touch but do not mesh with one another.

These bristles prevent seeds from the heads passing between the members to the ground and these seeds are instead directed towards the upper surfaces 28' of the members which are formed as troughs due to the edges 17.

Reference character 36 shows a plurality of spaced and parallel lifting bars. These lifting bars include an upper portion 37 which inclines forwardly and downwardly from the device, the curved portions 38 and the lower securing portions 39 which incline upwardly towards the members 16.

The parting members 16 are provided with channel reinforcements 40 on the underside thereof and the inner ends 41 of the portions 39 of the lifting bars are pivotally secured within these reinforcing channels so that the areas 42 of the lifting bars normally rest upon the ground and can move upwardly and downwardly if the ground is uneven. These lifting bars are mounted upon the underside of certain of the members 16.

The provision of these lifting bars elevates broken down sunflower heads and stalks upwardly prior to entering the machine so that they are severed about the members 16 and not below under which circumstances, of course, they will fall to the ground and be wasted.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is;

1. A sunflower gatherer for combine harvesters which include a knife assembly transversely across the front thereof; said knife assembly including forwardly projecting fingers, said gatherer comprising in combination a plurality of spaced and parallel forwardly extending parting members secured to the front of said combine, each parting member in cross section defining a substantially U-shaped trough, a rotatable multi-lobed gathering component spanning adjacent the inner ends of said members and being spaced slightly above said members and a plurality of bristles secured along the side edges of said parting members, said bristles inclining upwardly and outwardly from said sides, said bristles of adjacent sides barely touching one another.

2. The device according to claim 1 which includes at least two lifting bars each pivotally secured to and extending forwardly of said members in spaced and parallel relationship, said lifting bars including lower portions resting on the ground surface forwardly of said gatherer, said lifting bars elevating the heads of broken down sunflowers above said parting members.

3. The device according to claim 1 in which said members are secured to and supported behind said fingers.

4. The device according to claim 3 which includes at least two lifting bars each pivotally secured to and extending forwardly of said members in spaced and parallel relationship, said lifting bars including lower portions resting on the ground surface forwardly of said gatherer, said lifting bars elevating the heads of broken down sunflowers above said parting members.

5. The device according to claim 1 which includes a forwardly curved shield also situated across the inner ends of said members but forwardly of said component, the lower edge of said curved shield being spaced from the upper surface of said members.

6. The device according to claim 5 which includes at least two lifting bars each pivotally secured to and extending forwardly of said members in spaced and parallel relationship, said lifting bars including lower portions resting on the ground surface forwardly of said gatherer, said lifting bars elevating the heads of broken down sunflowers above said parting members.

7. The device according to claim 5 which includes a pair of side parting plates one upon each side of said components, said shield extending between and being secured to said side parting plates.

8. The device according to claim 7 which includes at least two lifting bars each pivotally secured to and extending fowardly of said members in spaced and parallel relationship, said lifting bars including lower portions resting on the ground surface forwardly of said gatherer, said lifting bars elevating the heads of broken down sunflowers above said parting members.

9. The device according to claim 5 in which said members are secured to and supported behind said fingers.

10. The device according to claim 9 which includes at least two lifting bars each pivotally secured to and extending forwardly of said members in spaced and parallel relationship, said lifting bars including lower portions resting on the ground surface forwardly of said gatherer, said lifting bars elevating the heads of broken down sunflowers above said parting members.

11. The device according to claim 9 which includes a pair of side parting plates one upon each side of said components, said shield extending between and being secured to said side parting plates.

12. The device according to claim 11 which includes at least two lifting bars each pivotally secured to and extending forwardly of said members in spaced and parallel relationship, said lifting bars including lower portions resting on the ground surface forwardly of said gatherer, said lifting bars elevating the heads of broken down sunflowers above said parting members.

* * * * *